United States Patent [19]

Hayama et al.

[11] 4,420,537
[45] Dec. 13, 1983

[54] MAGNETIC RECORDING MEDIUM HAVING COBALT ADSORBED IRON OXIDE LAYER

[75] Inventors: Masashi Hayama; Hiroto Saguchi; Kenji Hirabayashi, all of Tokyo, Japan

[73] Assignee: TDK Electronics Co. Ltd., Tokyo, Japan

[21] Appl. No.: 210,356

[22] Filed: Nov. 25, 1980

[30] Foreign Application Priority Data

Nov. 28, 1979 [JP] Japan ................................ 54-152913

[51] Int. Cl.³ .......................... G11B 5/70; B32B 5/16
[52] U.S. Cl. .................................. 428/403; 252/62.54; 252/62.56; 360/134; 360/135; 360/136; 427/128; 428/692; 428/694; 428/900
[58] Field of Search ......................... 252/62.54, 62.56; 428/694, 692, 900, 695, 403; 427/128; 360/134–136

[56] References Cited

U.S. PATENT DOCUMENTS

| | | | |
|---|---|---|---|
| 3,586,630 | 6/1971 | Irgersoll | 252/62.54 |
| 4,018,968 | 4/1977 | Neumann et al. | 252/62.54 |
| 4,063,000 | 12/1977 | Aonuma et al. | 252/62.55 |
| 4,197,347 | 4/1980 | Ogawa et al. | 75/0.5 BA |
| 4,197,357 | 4/1980 | Huisman | 428/900 |
| 4,302,510 | 11/1981 | Umeki et al. | 428/900 |
| 4,323,596 | 4/1982 | Buxbaum et al. | 428/900 |
| 4,352,859 | 10/1982 | Yoda | 428/900 |

FOREIGN PATENT DOCUMENTS 55-111105  8/1980  Japan .................................. 428/692

Primary Examiner—Ellis P. Robinson
Attorney, Agent, or Firm—Oblon, Fisher, Spivak, McClelland & Maier

[57] ABSTRACT

A magnetic recording medium comprises a substrate coated with a magnetic composition comprising a cobalt adsorbed iron oxide powder with a phosphoric ester type anionic surfactant at a ratio of 2 wt. % or more and a binder at a ratio of said iron oxide powder to said binder of 4 or more.

A magnetic recording medium has a coercive force Hc of 950 to 1200 Oe and a residual magnetic flux $\phi_r$ of 0.35 to 0.6 maxwell.

1 Claim, 2 Drawing Figures

MAGNETIC RECORDING MEDIUM HAVING COBALT ADSORBED IRON OXIDE LAYER

BACKGROUND OF THE INVENTION

1. Field of the Invention

The present invention relates to a magnetic recording medium. More particularly, it relates to a magnetic recording medium suitable for an audio cassette tape for metal position using a cobalt adsorbed iron oxide.

2. Description of the Prior Arts

Recently, a magnetic tape using a metallic powder as a magnetic powder which is called as a metallic tape has been proposed and used as an audio cassette tape having high performances. These tapes have a coercive force Hc of 950 to 1200 Oe and a residual magnetic flux density Br of 2400 to 3200 G which are about 2 to 3 times of those of the conventional audio cassette tapes as remarkably high performances which have not attained in the conventional ones. However, the cost is remarkably expensive since a metallic powder as pure metal is used as a magnetic medium. The metallic powder is easily oxidized whereby it is difficult to attain a technology for preventing oxidation and there is possibility to cause firing. Therefore, it is not easy to produce a metallic tape in stable and economical in a mass production.

The metallic tape has excellent MOL (maximum output level) as dynamic range but has not always high sensitivity which is the weakpoint thereof.

Such troubles can be overcome if the characteristics of the metallic tape can be provided by using an iron oxide type magnetic powder as the magnetic medium source. The high frequency maximum output level is improved by increasing a coercive force Hc which can be attained by adsorbing or doping cobalt to iron oxide powder. However, the low frequency maximum output level is inferior if the residual magnetic flux density (Br) is not increased whereby the tone quality is unbalanced. This is the reason why the conventional iron oxide type magnetic power could not be used.

In order to attain a coercive force of a tape of more than 950 Oe and a low frequency sensitivity and a maximum output level which are the same or higher than those of the metallic tape, it is necessary to have magnetic flux ($\phi_r$) of 0.35 maxwell or higher (magnetic flux: $\phi_r = Br \times$ sectional area of tape). Thus, in order to attain such high performances for the conventional iron oxide type magnetic recording tape, it is necessary to give a relatively thick coated layer. In the case of the audio cassette tape, the thickness of the coated layer should be usually 7.5$\mu$ or less in view of the structure thereof. When Br is 1800 G or higher, it is easy to attain $\phi_r$ of 0.35 maxwell or more. However, it has been difficult to give such high Br in the conventional iron oxide type magnetic recording tape.

SUMMARY OF THE INVENTION

It is an object of the present invention to provide a magnetic recording medium having high residual magnetization and high coercive force which are the same or higher than those of the metallic tape, by using an iron oxide type magnetic powder.

The foregoing and other objects of the present invention have been attained by providing a magnetic recording medium which comprises a substrate coated with a magnetic composition comprising a cobalt adsorbed iron oxide powder with a phosphoric ester type anionic surfactant at a ratio of 2 wt.% or more and a binder at a ratio of said iron oxide powder to said binder of 4 or more.

DETAILED DESCRIPTION OF THE PREFERRED EMBODIMENTS

Figure 1:
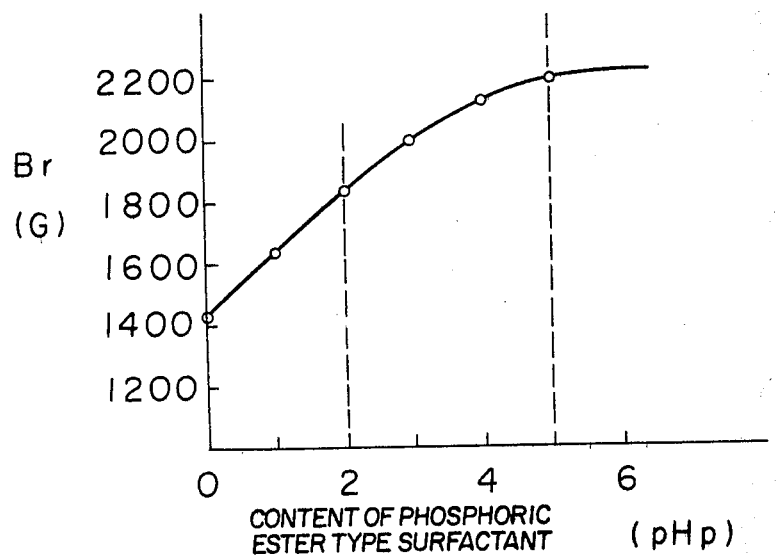
FIG. 1 is a graph showing relation of the residual magnetization and the content of the phosphoric ester type surfactant used in the magnetic recording tape in Example 2.

In the conventional iron oxide type magnetic recording tape, the coercive force has been remarkably improved by the cobalt-adsorption etc., however, the residual magnetic flux density Br was only about 1100 to 1500 gauss.

In accordance with the present invention, a phosphoric ester type anionic surfactant is incorporated in the cobalt adsorbed iron oxide powder and a ratio of the iron oxide powder to the binder is selected to be a desired range whereby the residual magnetic flux density Br is remarkably increased. As it is found in the examples, the residual magnetic flux density Br can be 1800 gauss or more. The cobalt adsorbed magnetic iron oxide is used whereby the coercive force Hc can be remarkably high.

The preparation of the magnetic recording medium of the present invention will be described in detail.

The phosphoric ester type anionic surfactant as a dispersing agent is incorporated at a ratio of 2 wt.% of more preferably 2 to 5 wt.%, to the cobalt adsorbed iron oxide powder together with a lubricant, a stabilizer and a polymer lacquer in a ball mill or a sand grinding mill to disperse them to prepare a magnetic composition. It is further effective for improving the residual magnetic flux density Br to knead in high shearing force, the mixture in the condition of high viscosity by a high pressure kneader before the dispersion by the ball mill or the sand grinder mill. It is important to give a ratio of the magnetic powder (P) to the binder as a resin (B) of 4.0 or more preferably 4.0 to 7.0. The resulting magnetic composition is coated on a polyethyleneterephthalate film under the magnetic field orientation treatment and is dried and processed by a high pressure calender for a mirror surface processing. This is cut in a wide for a cassette tape to obtain a magnetic recording tape.

In accordance with the present invention, it is possible to attain high residual magnetic flux density Br and high coercive force Hc which are considered to be impossible for the conventional iron oxide type magnetic recording tape. Excellent magnetic recording tape having a residual magnetic flux density Br of 1800 gauss or higher and a coercive force Hc of 950 to 1200 Oe and a magnetization of 0.35 to 0.60 maxwell (in a thickness of 7.5 $\mu$ or less) can be provided.

The iron oxide used in the present invention is an acicular $Fe_3O_4$ or $\gamma$-$Fe_2O_3$. The iron oxide is treated with a cobalt compound. The cobalt doped iron oxide and the cobalt adsorbed iron oxide are considered as cobalt modifications. In the former, the reprinting characteristic and the temperature characteristic are inferior to those of the latter though the former has high coercive force Hc. Therefore, the cobalt adsorbed iron oxide is used in the present invention.

The present invention will be further illustrated by certain examples and references which are provided for purposes of illustration only and are not intended to be limiting the present invention.

EXAMPLE 1

The following components were used.

| | |
|---|---|
| Co-adsorbed iron oxide | 100 wt. parts |
| Phosphoric ester type anionic surfactant (trade name GAFAC RE610) | 3 wt. parts |
| Vinyl chloride-vinyl acetate-vinyl alcohol copolymer (trade name VAGH) | 16 wt. parts |
| Nitrile rubber (trade name Hyca 1432F) | 4 wt. parts |
| Lubricant | 1 wt. parts |
| Methyl ethyl ketone | 50 wt. parts |
| Methyl isobutyl ketone | 50 wt. parts |
| Toluene | 50 wt. parts |

The above-mentioned components were treated by a sand grinding mill for 3 hours to disperse them to prepare a magnetic composition. The magnetic composition was coated on a polyester film having a thickness of $12\mu$ in a thickness of about $5.8\mu$ under a magnetic field orientation treatment and was dried and processed by high pressure calender for a mirror surface processing. This was cut in a width of 3.81 mm to obtain an audio cassette tape.

EXAMPLE 2

In accordance with the process of Example 1 except varying the content of the phosphoric ester type anionic surfactant in a range of 0 to 5 (0 to 5 pHp) each magnetic recording tape was prepared and compared in the same conditions. The results are shown in FIG. 1.

REFERENCE 1

In accordance with the process of Example 1 except using a nonionic surfactant of sorbitane monooleate (trade name Sorbon S-80) at the same content instead of the phosphoric ester type anionic surfactant, a magnetic recording tape was prepared and tested in the same conditions. The result is shown in Table 2.

EXAMPLE 3

Figure 2:
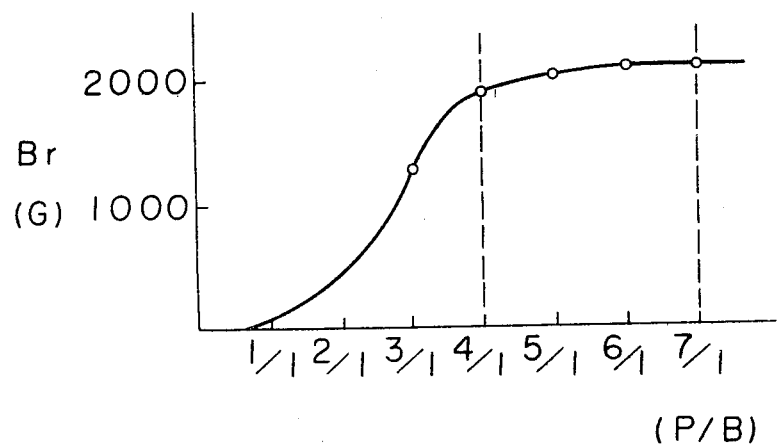
FIG. 2 is a graph showing relation of the residual magnetization and the ratio of the iron oxide powder to the binder in the magnetic recording tape in Example 3.

In accordance with the process of Example 1 except that varying the total amount of the vinyl chloride-vinyl acetate-vinyl alcohol copolymer and the nitrile rubber (the same ratio of 4:1) in a range of 12.5 to 100 wt. parts, each magnetic recording tape was prepared and tested in the same condition. The results are shown in FIG. 2.

TABLE 1

| | Hc (Oe) | $\phi_r$ (maxwell) |
|---|---|---|
| Conventional iron oxide type tape | 300 to 650 | 0.12 to 0.42 |
| Tape of the present invention | 950 to 1200 | 0.35 to 0.6 |
| Commercially available metallic tape | 950 to 1200 | 0.35 to 0.55 |

TABLE 2

| | Commercially available metallic tape | Tape of Example 1 | Tape of Reference 1 |
|---|---|---|---|
| Thickness of coated layer ($\mu$) | 4.0 | 5.8 | 5.7 |
| Magnetic characteristics | | | |
| Hc (Oe) | 1050 | 1037 | 1046 |
| $\phi_r$ (maxwell) | 0.43 | 0.44 | 0.34 |
| Electromagnetic transfer characteristic (dB) | | | |
| MOL 333 | 0 | 0.5 | −2.6 |
| MOL 10K | 0 | 0 | −0.3 |
| S-333 | 0 | 0.4 | −2.1 |
| S-3K | 0 | 1.0 | −1.1 |
| S-10K | 0 | 1.3 | −0.5 |
| S-16K | 0 | 2.0 | 0.2 |

As it is found in FIG. 1, when the content of the phosphoric ester type anionic surfactant is 2 wt.% or more (2 pHp; 2 per 100 of cobalt adsorbed acicular iron oxide), the residual magnetic flux density Br can be 1800 gauss or more. When the content of the phosphoric ester type anionic surfactant is more than 5 wt.%, the effect is not further improved and certain blooming is caused. That is, the surfactant is bloomed out from the magnetic layer. Therefore, the content of the phosphoric ester type anionic surfactant is 2 wt.% or more preferably in a range of 2.5 to 5 wt.%.

As it is found in FIG. 2, when a ratio of the cobalt adsorbed iron oxide P to the binder B is 3.5 or more, the residual magnetic flux density Br is 1800 gauss or more. However, the curl of the magnetic recording tape is remarkably high in a range of 3.5 to 4.0. Therefore, P/B should be 4 or more. If P/B is too large, the strength of the magnetic layer is decreased. According to many tests, it was found to be preferably P/B of less than 6.0. Therefore, P/B is usually 4.0 or more and preferably in a range of 4.5 to 6.0.

As shown in Table 1, the magnetic recording tape of the present invention had remarkably excellent magnetic characteristics and Hc and $\phi_r$(maxwell) of the magnetic recording tape of the present invention are superior to those of the conventional iron oxide type magnetic recording tape and the same as those of the metallic tape. The advantages of the magnetic recording tape of the present invention are clearly found. In Table 2, the magnetic recording tape of Example 1 of the present invention had characteristics superior to those of the metallic tape because of the incorporation of the phosphoric ester type anionic surfactant. On the other hand, when the nonionic surfactant is used as a dispersing agent, the maximum output level and the frequency characteristic are inferior. As it is clearly found, the effect of the present invention is attained by the incorporation of the phosphoric ester type anionic surfactant.

In accordance with the present invention, the magnetic recording medium having characteristics of the same or superior to those of the conventional metallic tape is obtained by using the cobalt adsorbed iron oxide powder.

We claim:

1. A magnetic recording medium having a coercive force Hc of 950 to 1200 Oe and a residual magnetic flux $\phi_r$ of 0.35 to 0.6 maxwell which comprises a substrate coated with a magnetic composition comprising a cobalt adsorbed iron oxide powder, a phosphoric ester type anionic surfactant as a dispersing agent at a ratio of 2 wt.% to 5 wt.% based on said iron oxide powder, and a binder at a ratio of said iron oxide powder to said binder of 4 to 7.

* * * * *